April 27, 1965   G. P. SCHWARTZ ETAL   3,180,445
FREQUENCY SPECTRUM CONTROL FOR SEISMIC SIGNALS
Filed Dec. 21, 1960   2 Sheets-Sheet 2

Gaylord P. Schwartz
Jesse D. Skelton   Inventors

By *John D. Gassett*   Attorney

3,180,445
FREQUENCY SPECTRUM CONTROL FOR SEISMIC SIGNALS

Gaylord P. Schwartz, Minneapolis, Minn., and Jesse D. Skelton, Tulsa, Okla., assignors to Jersey Production Research Company, a corporation of Delaware
Filed Dec. 21, 1960, Ser. No. 77,356
10 Claims. (Cl. 181—.5)

This invention relates to improvements in the art of determining the nature and position of subsurface strata by seismic methods. It is particularly concerned with a new system for processing a seismic signal.

A method commonly employed in searching for petroleum products or other mineral deposits is that known as seismic prospecting wherein a seismic disturbance is initiated at a selected point in or near the earth's surface to direct seismic waves downward into the earth from that point. The waves continue to travel downward within the earth until they encounter discontinuities in the earth structure or composition in the form of various substrata formations and the like. These discontinuities have the effect of reflecting a portion of the seismic waves back toward the surface of the earth. Sensitive pickups sometimes called seismic detectors, seismometers or geophones are arranged at detection points along the earth to translate the detected earth motion into electrical impulses which after suitable amplification are recorded. The signal recorded then is usually indicative of the character of the ground motion and of the position of the reflecting beds and are usually referred to collectively as a seismic signal which is in effect a composite signal made up of a plurality of electrical signals varying in frequency and amplitude. The electrical signals oscillate about a no signal zero voltage or quiescent record base line. The seismic signal thus detected and recorded is then processed and displayed in various ways.

It is the general practice to amplify the seismic signal generated by a geophone and to record the signal by means of a suitable camera. The camera may take the form of a recording oscillograph or as is more recently the case, it may take the form of a magnetic or a photographic recording device capable of recording the signal in reproducible form. It is this amplified record signal with which seismic computers make their study.

Most conventional seismographs, that is, devices for recording the seismic signals, are capable of recording up to 24 or more separate seismic signals simultaneously. Thus, if a seismic observation results in 24 seismic signals being generated at as many detection stations, the resulting seismogram is a 24-trace record of the resulting 24 signals. The traces are usually arranged in a side-by-side relationship and a timing trace indicating predetermined time intervals is simultaneously recorded with the seismic signals to indicate the elapsed time from the shot to any point on each trace. Once the seismogram has been made, persons skilled in the art are generally able to determine from the data recorded on the seismogram certain characteristics of the earth substrata in the vicinity of the seismic observation. Usually a series of seismograms are arranged in a side-by-side relationship in order to give a seismic section of a portion of the earth under study. The additional seismograms are usually obtained by having a sequence of seismic disturbances at some selected pattern. A selected pattern of seismic observations are also made for each seismic disturbance and a seismogram is prepared for each seismic observance. The seismograms, then, in order to obtain a larger "picture" of the subsurface formation are arranged in a side-by-side relationship forming what is commonly called a seismic section.

In studying a seismic section it has been found that changes in subsurface layering or bed parameters may be expressed on the seismogram or seismic section as changes in the frequency content or amplitude of reflections from the layering or discontinuities. Unfortunately, other factors which are called therein for convenience shooting (and recording) parameters can also change these measured quantities. In order to properly correlate the frequency and amplitude content of the recorded seismic signals with stratigraphy it is desirable that the shooting parameters be constant along the seismic line; that is, along the line of the seismic section under study. It is quite difficult to guarantee a constant downtraveling pulse in the field due to varying conditions of various shot points and the like. Therefore, there is a need for a playback technique or processing system whereby the effect of changing near shot point conditions on the field data can be eliminated from the data when processed. Such a processing system is disclosed herein.

It is convenient to describe the character of a seismogram as being dependent upon the parameters of three basic units: (1) the seismic source, (2) the reflection travel path, and (3) the recording equipment. More specifically, the frequency and amplitude content of recorded reflections are dependent upon the charge size and the shot depth of the source, the time geometry and other properties of the reflecting beds, and the recording parameters, including the filtering action of geophone coupling and near surface variations, for example.

To study changes in reflection forms for stratigraphic significance, it is important that the source and receiver parameters be kept constant along the seismic line of the seismic section. Then one can safely correlate observed amplitude and frequency changes to the property of the reflection beds. Unfortunately, this condition is not easily satisfied in practice. Quite frequently the shape of the initial downtraveling pulse changes from one shot point to the next which may be due to the use of a different charge size in case of dynamite explosion, for example, or a different shooting medium; that is, the velocity of the near surface layer may vary. This pulse change along the profile caused by charge size, etc. is usually expressed as a change in the form of the recorded section. Even if one is successful in having a downtraveling pulse that is constant, uptraveling reflections can be altered by near surface or surface conditions. As an example of the problem involved, a reflection event might be indicated to appear on one portion of a seismic section as a change in frequency from 30 to 32 cycles per second and the same event might appear elsewhere on the seismic section as being indicated by the change of frequency from 34 to 36 cycles per second. The difference in frequency content of the signal representing the same reflection event may not be due to any property of the reflecting bed, but rather an expression of the fact that the input pulse had changed from one shot point to the other. The occurrence of different frequencies of this type is confusing and makes more difficult the process of interpretation of the seismic section.

As present field technique does not provide for a convenient means for predicting and eliminating the effects discussed above except by costly reshooting on a trial and error basis, the logical approach is the compensation for near shot variations by a special or unique seismic processing system for the recorded seismic signals. In the system herein disclosed, equalized data (i.e. data free of frequency changes due to near shot conditions) are obtained which would have been recorded in the field had it been possible to maintain constant shooting conditions.

In examining the factors determining the shape of recorded seismic pulses, an earth section can be considered a "block box" filter. Into one end of the filter is fed an input or shot pulse and the output of the filter can be considered the recorded seismogram. In describing this process, the input and output pulses in time can be expressed as integrals over frequency with the Fourier integral. The initial shot pulse or input signal can be expressed as $f(t)$. The frequency domain of $f(t)$ is described by the frequency spectrum $a(w)$. These quantities are related in the Fourier integral $$f(t) = \frac{1}{2\pi} \int a(w) e^{iwt} dw$$

The transfer function of the earth filter can be expressed by $S(w)$ and the recorded seismic traces by $F(t)$. These quantities are similarly related $$F(t) = \frac{1}{2\pi} \int a(w) S(w) e^{iwt} dw$$

The seismograph $F(t)$ is a record of many reflections which will have, in general, different amplitudes and phases and will arrive at different times. If the seismogram were long and if the reflections arrive randomly in time, the frequency spectrum of the complete recorded signal would be $a(w)S(w)$. If the measurement of a frequency spectrum is taken over an interval which is large compared to the duration of a single reflection, then that spectrum is a good approximation to the quantity $a(w)S(w)$. Parameters which need to be considered such as the filtering action of the near surface material, geophones, recording amplifiers, etc. are included into the term $a(w)$.

In the practice of this invention consider two seismic records from two adjacent shot points, for example. The frequency spectra of each seismic record will be produced. Means for providing this is described in detail hereinafter. The frequency spectra curves describe the relative frequency content of that portion of the record measured. It has been found that although the time is not especially critical, three seconds of record time generally gives good information as to frequency content of the seismic record. Furthermore, since this measurement is made over an interval large compared to a single reflection, these spectra are almost entirely a function of the input pulse $a(w)$. The spectra are compared and any differences are due to near shot conditions. It is an object of this invention to remove the differences in the spectra which are due to the near shot conditions.

In eliminating the effects of the variable shot conditions a seismic signal is separated into selected frequency components with each frequency component thus separated being subject to independent amplification. The separated selected frequency components are then recombined. A recombined signal is then passed into two paths, one path is used to supply a monitor signal which is separated into the same selected frequency components as the original seismic signal was separated into. This decomposition describes the frequency content of the equalized signal. The frequency spectrum of the recombined signal is thus continuously monitored and the amplification of the various frequency components of the original seismic signal are modified to obtain the desired equalized frequency spectrum. When the desired frequency spectrum is obtained the recombined signal is recorded or otherwise displayed as desired from the second path.

Other objects and a better understanding of the invention may be had by reference to the drawing in which:

FIG. 5 illustrates a modified portion of FIG. 1 from the signal source to the adding network and specifically includes amplifiers.

Figure 1:
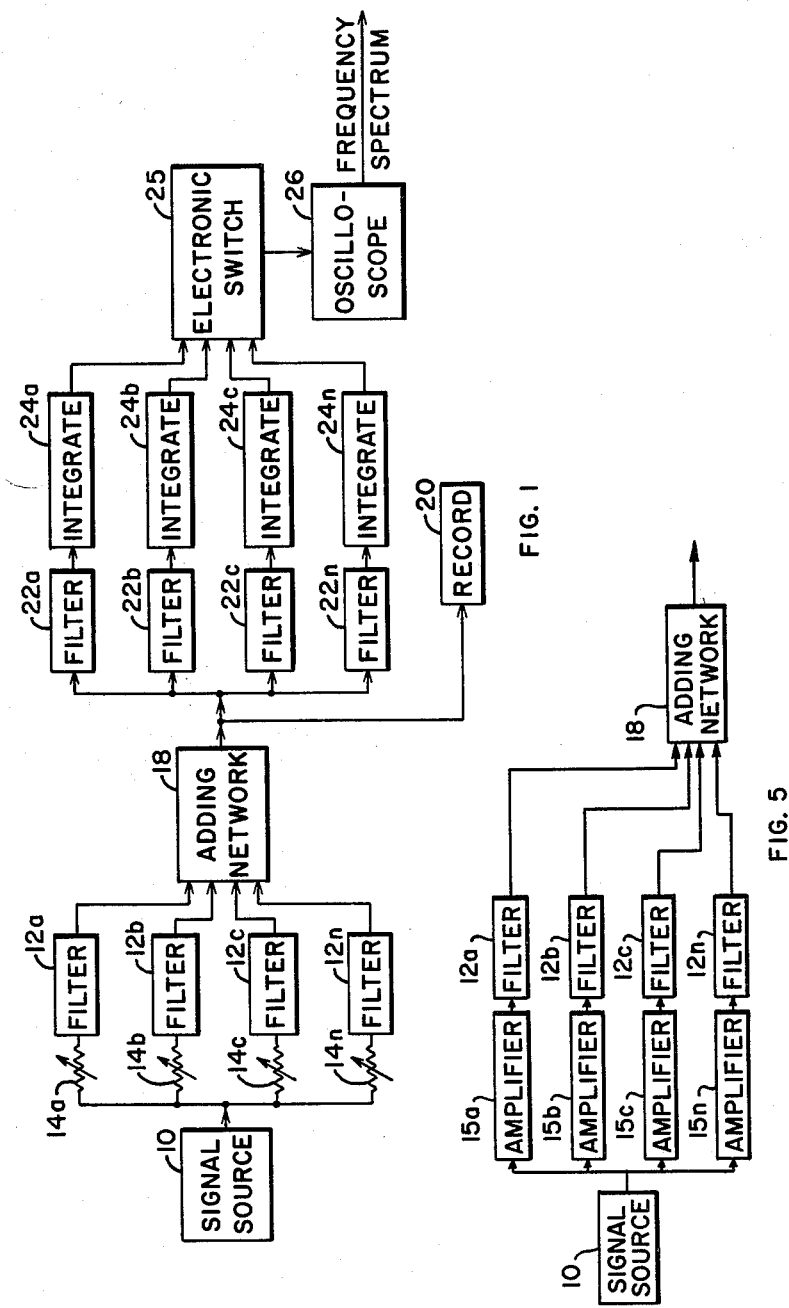
FIG. 1 is a block diagram showing component parts of the best mode contemplated for carrying out the invention.

Referring now to the drawing in FIG. 1 in particular, there is illustrated in block diagram form the best mode contemplated for processing a seismic signal in accordance with this invention. Reference numeral 10 represents a seismic signal source. This signal source may include a seismic signal amplified and coming direct from a geophone or a geophone location; however, it will normally be from a signal from a geophone which has been recorded in reproducible form such as on magnetic tape. The output from signal source 10 is fed to a plurality of parallel filter sections. Each filter section has a narrow bandpass filter 12 and an adjustable gain control means 14. The adjustable control means can for example be an automatic volume control unit. It will be noted that there are filters 12a through 12n and gain control means 14a through 14n. The gain control for each band pass filter 12 can preferably be amplifiers 15 as shown in FIG. 5. As shown in that figure, filters 12a through 12n are connected respectively to amplifying means or amplifiers 15a through 15n. The outputs from filters 12a to 12n are fed to adding network 18 as also shown in FIG. 1. Filter 12a is preferably a narrow bandpass filter with an adjustable center frequency. Filters 12b, 12c through 12n are similar to filter 12a; however, each of the filters are designed and adjusted to pass a different frequency component therethrough. For example, in the seismic signal illustrated in FIG. 2 the frequencies of interest are from 20 cycles per second to 56 cycles per second.

Figure 2:
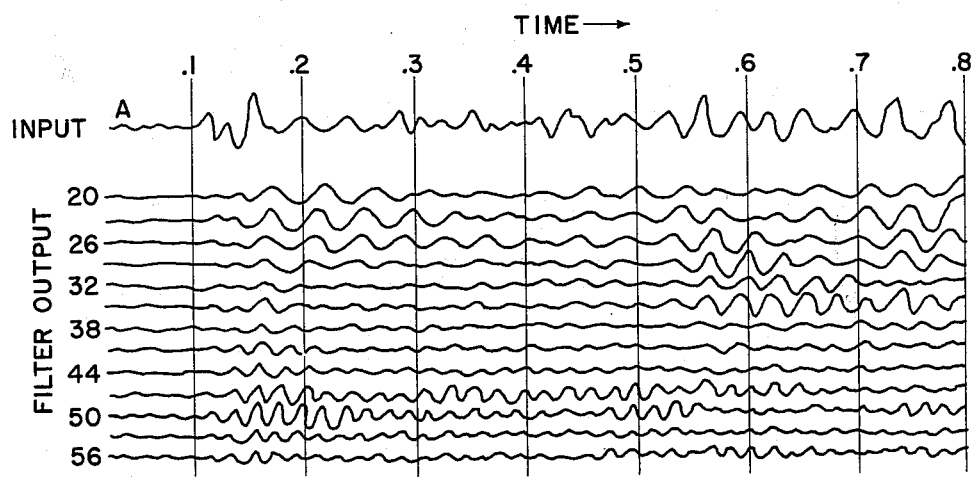
FIG. 2 illustrates a typical seismic signal and selected frequency components thereof.

In a successful analysis of the seismic signal A illustrated in FIG. 2 the filters 12a through 12n of FIG. 1 were sharply peaked filters which were tuned to frequencies at 3 cycles per second spacing ranging from 20 to 56 cycles per second. In general, it can be said that it is desirable that the filter bandpass be sufficiently sharp that most of the frequencies lying outside of the pass band will be effectively rejected. On the other hand, the pass band must be sufficiently broad so as to be compatible with the number of such filters employed, so as to guarantee the passage of all frequencies in the span of interest through one and only one filter channel. That is, for a total span of interest of from 20–60 c.p.s. (a total frequency range of 40 c.p.s.), employment of $n$ such filters would require that each have a pass band of $40/n$ c.p.s., centered around its peak frequency $f_0$. Each filter also should have a cutoff sharpness such that those frequencies outside of the range $f_0 \pm 40/2n$ c.p.s. are rejected. The delay of the signal passing through the various filters is different for each filter; however, this variation in delay can normally be considered negligible and no compensating delay means are normally necessary. However, if variation in delay becomes great, of course, compensating delay means may be incorporated with each filter section.

Figure 3:
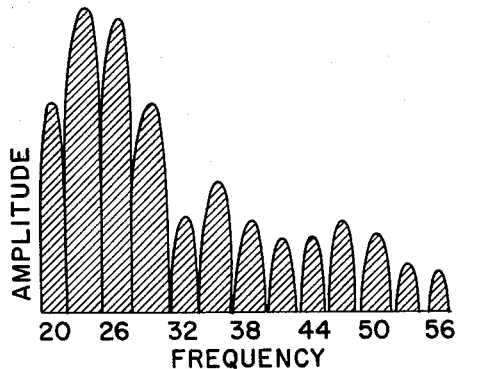
FIG. 3 illustrates a frequency spectrum of the seismic signal of FIG. 2.

The output from filters 12a through 12n are added together as, for example, through known adding network 18. The recombined signal is divided into two paths from adding network 18. One path being to display or record means 20 where the signal is recorded and displayed if desired and the like. The other path from adding network 18 is to a second set of parallel filters 22a through 22n. Filters 22a through 22n are identical to filters 12a through 12n. The outputs of filters 22a through 22n are fed to integrators 24a through 24n. The integrators are of a character to integrate the amplitudes of the output signal from filters 22a through 22n over a desired period. The voltage from the integrators 24a through 24n are fed to multi-channel electronic switch 25 and displayed on oscilloscope 26. FIG. 3 illustrates a frequency spectrum that is displayed on the oscilloscope. This is the frequency spectrum of the input seismic signal illustrated as curve A of FIG. 2. Each spike represents the integrated amplitude of a filter channel output over the selected time gate interval. The curve is electronically "plotted" on the oscilloscope face each time the seismic signal is reproduced. By adjusting the gain controls 14a to 14n of the filter channels and observing the effect on the oscilloscope, the desired equalized frequency spectrum is readily achieved. When this frequency spectrum is achieved, the signal fed to display or record 20 is a "new" seismic signal which has this equalized frequency spectrum.

Figure 4:
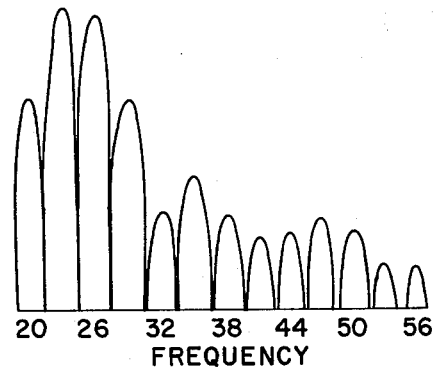
FIG. 4 illustrates an overlay representing a selected frequency spectrum.

To briefly summarize the operation of this system, the desired frequency spectrum is first determined. One method of arriving at a selected frequency spectrum is by measuring an integrated frequency spectrum for each shot point in the seismic line. If the set of measured spectra are nearly identical, the shooting conditions were nearly constant and no equalization is needed. If variations in measured spectra are observed the next step is to determine which spectrum is most typical of the set. Quite frequently most records on a line will have similar spectra and anomalous shot points will be obvious. Once the desired frequency spectrum is determined the procedure is to operate on each anomalous record to force its frequency spectrum to look like the selected one. The desired frequency spectrum is obtained by adjusting a filter gain control 14a through 14n until the desired spectrum is obtained which is evidenced on the oscilloscope. If desired, a typical overlay as illustrated in FIG. 4 can be prepared and applied to the face of the oscilloscope to aid in determining when the spectrum is in fact obtained. That would be effected by the gain control means 14a through 14n being adjusted to obtain the desired frequency spectrum on oscilloscope 26. The equalized signal is taken from adding means 18 to display mechanism 20. This system is especially useful in processing a signal when it is desired to show frequency content in a manner illustrated in the application of Frank G. Boucher, Serial No. 760,957, filed September 15, 1958, now Patent No. 3,072,907.

Each trace or seismic signal to be used in the preparation of a seismic section is equalized in the manner similar to that described above. The equalized seismic signals are arranged in a side-by-side relationship and displayed. The shot point parameter effects are eliminated which were present in the original recording or signal. The seismic section thus produced from the equalized seismic signals is much easier to interpret and understand. Any changes in frequency or amplitude, then, are those occasioned or caused by the subsurface layers or beds themselves and not in near surface conditions.

By modifying the integrated frequency spectrum of the seismic signal, the frequency content of the downtraveling pulse is equivalently modified. As a consequence, then, the equalized trace is one which would have been recorded in the field had it been possible to pick the proper shooting conditions. In an example of equalization in the practice of this invention, six seismic signals were recorded from the detonation of a 10 pound dynamite shot in a hole 80 feet from the surface. Six seismic signals were then recorded from identical geophone locations from another 10 pound dynamite shot detonated 45 feet down in the same shot hole as the 80 feet shot. All of the other conditions were maintained constant. The seismic data from the 80 feet shot showed three reflections separated by high frequency inflections. The same reflection zone from the 45 feet shot was cyclic and was clearly an anomalous condition due to reshooting parameters. The 45 feet data was then equalized to have a frequency spectrum similar to the 80 feet data. The previously cyclic reflection zone was then divided into three distinct reflections which were similar in character from that of the 80 feet shot. In other words, the frequency and amplitude changes due to the near shot conditions were removed.

It will be apparent to persons skilled in the art that many modifications of this invention are possible without departing from the spirit or scope thereof. Therefore it is intended that the invention not to be limited to the specific examples presented. It is therefore desired that only such limitation be imposed on the appended claims as are stated therein or required by the prior art.

What is claimed is:

1. A method of processing a seismic signal to have a predetermined frequency force spectrum which comprises the steps of: separating the seismic signal into selected frequency components; amplifying each frequency component thus separated; combining said selected frequency components after amplification; separating the combined seismic signal into the same selected frequency components as the original seismic signal was separated into; plotting the frequency spectrum of the frequency components; and adjusting the amplification of the various components to give the desired frequency spectrum.

2. An apparatus for processing a seismic signal which comprises in combination: a first set of a plurality of parallel filters with each said filter being tuned for a selected frequency band; amplification means for each frequency component passing through each said filter; adding means to add the output of said filter means; a second set of parallel filter means similar to said first set of parallel filter means; means electrically connecting the input of each said filter of said second set with said adding means; integrating means electrically connected to the output of each said filter of said second set of parallel filters; and means to display as a frequency spectrum the output of said integrating means.

3. An apparatus for processing a seismic signal which comprises in combination: a first set of a plurality of parallel sharply turned bandpass filter sections with each filter section being tuned for a different frequency; a plurality of automatic volume control units, each unit being of a character to adjust the gain of the output of each said filter section; adding means to add the output of said filter sections; a second set of parallel filter sections in which the second set of filters are similar to the filters in the first filter section; means electrically connecting each said filter of said second set with the output from said adding means; means to display the frequency spectrum of the output from said second bandpass filter sections; and recording means electrically connected to the output of said adding means.

4. A method of processing a seismic signal to have a predetermined frequency force spectrum which comprises the steps of: separating the seismic signal into selected frequency components; amplifying each frequency component; combining said selected frequency components; dividing the combined signal into a first path and a second path; separating the combined seismic signal in said first path into the same selected frequency components as the original seismic signal was separated; integrating the frequency components of the combined signal; plotting the frequency spectrum of the integrated frequency components; adjusting the amplification of each frequency component to give the desired frequency force spectrum; and thereafter recording the second path of said combined signal.

5. A system for seismic exploration which comprises in combination: means for generating a seismic disturbance near the surface of the earth; means for detecting the reflection of the seismic signal from subsurface formations at a point on the surface of the earth; a first set of plurality of parallel filters for separating individually selected frequency components of the seismic signal detected; amplifying means for amplifying the frequency component of each of said filters; adding means for combining the output of each said filter means; a second set of parallel filters similar to said first set of parallel filters and electrically connected to the output of said adding means; integrating means electrically connected to the output of each said filter of said second set of parallel filters; means to display as a frequency spectrum the output of said integrated means; and recording means electrically connected to said adding means.

6. A method for processing a seismic signal of a seismic section which comprises: equalizing each said seismic signal; and displaying said equalized signals as a seismic section; said equalizing step for each seismic signal including (a) separating that signal into selected frequency components, (b) amplifying each frequency component, (c) combining said selected frequency components after amplification into a recombined signal, (d) separating the recombined seismic signal into the same selected frequency components as the original seismic signal was separated into, (e) plotting the frequency spectrum of the frequency components, (f) adjusting the amplification of the various components to the desired frequency spectrum, and (g) recording the recombined signal.

7. An apparatus for processing a seismic signal which comprises in combination: a first set of parallel filter means with each said filter means being tuned to pass a selected frequency; means to adjust the amplification of the frequency component of each filter of said first set of filters; adding means to add the output of said first set of filters; a second set of parallel filter means similar to said first set of parallel filter means, the output of said adding means being electrically connected to the input of said second set of parallel filters; means to integrate and display as a frequency spectrum the outputs of said second set of parallel filters; and recording means electrically connected to said adding means.

8. A method of processing a seismic signal to have a predetermined frequency force spectrum which comprises the steps of: separating the seismic signal into selected frequency components; amplifying each frequency component; combining said selected frequency components to obtain a combined signal; dividing the combined signal into a first path and a second path; separating the combined seismic signal in said first path into the same selected frequency components as the original seismic signal was separated; integrating the frequency components of the combined signal; preparing an overlay upon the face of an oscilloscope, said overlay indicating the desired selected frequency force spectrum; displaying the frequency spectrum of the integrated frequency components on an oscillograph; adjusting the amplification of each frequency component so that the frequency spectrum of the integrated frequency components match the overlay; and thereafter recording the second path of said combined signal.

9. Repeating the method of claim 8 for each seismic record in the seismic section being processed using the same overlay.

10. An apparatus for processing a seismic signal which comprises in combination:
first means to plot the frequency spectrum of said seismic signal;
second means for comparing the frequency spectrum plotted by said first means with a selected frequency spectrum;
third means to adjust individually the weight of each of the frequency components of the seismic signal such that the frequency spectrum of the seismic signal can be adjusted to the selected frequency spectrum;
fourth means to combine the frequency components into an adjusted signal after the weight of each of such frequency components has been adjusted by said third means; and
fifth means to record the adjusted signal.

References Cited by the Examiner
UNITED STATES PATENTS

| | | | |
|---|---|---|---|
| 2,368,953 | 2/45 | Walsh | 340—5 |
| 2,723,387 | 11/55 | Slavin | 340—15 |
| 2,757,357 | 7/56 | Peterson | 340—15 |
| 2,794,965 | 6/57 | Yost | 340—15 |
| 2,950,459 | 8/60 | Loper et al. | 340—15 |
| 3,051,897 | 8/62 | Peterson et al. | 324—77 |

SAMUEL FEINBERG, *Primary Examiner.*

CARL W. ROBINSON, CHESTER L. JUSTUS,
*Examiners.*